(12) United States Patent
Wadey (10) Patent No.: US 8,239,897 B2
(45) Date of Patent: Aug. 7, 2012

(54) METHOD AND APPARATUS FOR MULTIPLE AUDIO OUTPUTS

(75) Inventor: Robert Wadey, Bingley (GB)

(73) Assignee: Eldon Technology Limited, Keighley (GB)

( * ) Notice: Subject to any disclaimer, the term of this patent is extended or adjusted under 35 U.S.C. 154(b) by 603 days.

(21) Appl. No.: 12/205,045

(22) Filed: Sep. 5, 2008

(65) Prior Publication Data

US 2010/0064339 A1    Mar. 11, 2010

(51) Int. Cl.
*H04N 7/18* (2006.01)

(52) U.S. Cl. .............. 725/80; 725/153; 348/565

(58) Field of Classification Search ........... 725/78–85; 348/563–565, 731–738, 906
See application file for complete search history.

(56) References Cited

U.S. PATENT DOCUMENTS

| | | | |
|---|---|---|---|
| 5,671,019 A * | 9/1997 | Isoe et al. | 348/565 |
| 6,477,705 B1 * | 11/2002 | Yuen et al. | 725/41 |
| 6,536,042 B1 * | 3/2003 | Paul | 725/69 |
| 6,567,984 B1 * | 5/2003 | Allport | 725/110 |
| 7,941,821 B2 * | 5/2011 | Stecyk et al. | 725/80 |
| 7,992,176 B2 * | 8/2011 | Margulis | 725/80 |
| 2001/0006382 A1 * | 7/2001 | Sevat | 345/169 |
| 2004/0196405 A1 * | 10/2004 | Spinelli | 348/565 |

* cited by examiner

*Primary Examiner* — Annan Shang
(74) *Attorney, Agent, or Firm* — Seed IP Law Group PLLC (57) ABSTRACT

A method for transmitting audio signals. The method of transmitting audio signals may include separately transmitting a video signal and an audio signal. Further, the method of transmitting audio signals may include transmitting a first video signal and a first audio signal to one component, transmitting a second video signal to the same component and separately transmitting a second audio signal to a second component.

16 Claims, 7 Drawing Sheets

METHOD AND APPARATUS FOR MULTIPLE AUDIO OUTPUTS

FIELD OF THE INVENTION

The present invention generally relates to receiving and transmitting audio signals and, more specifically, transmitting multiple audio signals from a single electronic device to multiple receivers.

BACKGROUND

Many households often have multiple televisions may be located in a household. Sometimes, within the household, a first user may wish to view one program and a second user may wish to view a different program made available by a content provider and received by a set-top box connected to the television. In this case, the two users may watch their respective programs on two separate televisions, which may be located in two different or the same room. If two televisions are in the same room, the users may have to either lower the volume on both televisions such that both users may hear their respective programs, or one of the users may mute their respective television and view the images with no audio.

In another example, one user may wish to view two programs that may air at overlapping times or two users may possess one television and still wish to view two programs airing at overlapping times. In either case, the user(s) may wish to employ picture-in-picture functionality that is available on some televisions. The picture-in-picture functionality allows one or more users to view one program on the main part of a television screen and a second program on a smaller inset overlapping the main screen. Although two programs may be viewed using picture-in-picture functionality, only one corresponding audio feed is typically available for listening. This audio feed is generally the one corresponding to the main video. Stated differently, the audio for one program may be available while the other program is muted or never initially decoded by the set-top box. Thus, a method of providing multiple audio outputs is desirable. Accordingly, there is a need in the art for a method of transmitting multiple audio outputs.

SUMMARY

One embodiment of the present invention takes the form of a device for transmitting an audio stream separately from a video stream. The device may include an input operative to receive a first signal and a second signal, a first tuner operative to receive the first signal from the input, where the first signal may include a first audio signal and a first video signal and a second tuner operative to receive the second signal from the input, where the second signal may include a second audio signal and a second video signal. The device may also include a first output operative to transmit the first audio signal and the first video signal, a second output operative to transmit the second video signal and a third output operative to transmit the second audio signal. Additionally, the device may include a first demodulator which may accept the first signal from the first tuner and which may be configured to generate a first audio signal and first video signal from the first signal and a second demodulator which may accept the second signal from the second tuner and which may be configured to generate the second signal into a second audio signal and second video signal. Further, the second audio signal may be a wireless signal. The device may also include a user input, the user input operative to change a frequency of at least the second audio signal.

Another embodiment of the present invention may take the form of a method for transmitting at least a first and second audio signal. The method may include transmitting the first audio signal and a first video signal to a first device, where the first video signal may be associated with the first audio signal and transmitting a second audio signal to a second device and a second video signal to the first device, where the second video signal may be associated with the second audio signal. The method may also include stripping the second audio signal from the second video signal prior to transmitting either the second audio signal or the second video signal. Additionally, the method may include receiving a command to adjust the second video signal relative to the first video signal and in response to receiving the command, transmitting the second audio signal to the first device. The method may also include further in response to receiving the command, transmitting the first audio signal to the second device.

Moreover, in this embodiment the method may display the first video signal on a first screen area of the first device and may display the second video signal on a second area of the first device. Furthermore, the first video signal may be switched to display on the second screen area of the first device and the second video signal may be switched to display on the first screen area of the first device. Additionally, the transmission of the first audio signal may be halted to the first device and the transmission of the second audio signal may be halted to the second device. The first audio signal may also be transmitted to the second device and the second audio signal may be transmitted to the first device.

Continuing this embodiment, the first screen area may surround the second screen area. Additionally, the method may include wirelessly transmitting at least one of the first and second audio signals. Further, the second audio signal may not be perceived without the second device. Also in this embodiment all transmissions may be performed by a third device that may be a set-top box.

Another embodiment of the present invention may take the form of a method for transmitting information. The method may include providing a first video signal for display on a first screen area of a first device, providing a second video signal for display on a second screen area of the first device, providing a first audio signal to the first device and providing a second audio signal to a second device. The method may also include generating the first video signal and the first audio signal and generating the second video signal and the second audio signal. Furthermore, the operation of separating the second set of information may include receiving the second set of information as a single signal including both the second video signal and second audio signal modulated together and demodulating the second video signal from the second audio signal. Additionally, the second audio signal may be converted from a first format to a second format and the second audio signal may be provided to the second device in the second format.

These and other advantages and features of the present invention will become apparent to those of ordinary skill in the art upon reading this disclosure in its entirety.

DETAILED DESCRIPTION OF EMBODIMENTS

Generally, one embodiment of the present invention may take the form of a signal transmission device for receiving and transmitting multiple video and audio signals. The signal transmission device as discussed herein may receive signals and process signals as well as transmit signals. Continuing the description of this embodiment, the signal transmission device may include at least a tuner, a storage device and an interface. The signal transmission device's tuners, generally process a signal received by the signal transmission device. The storage device may receive and store data such as audio-visual media or software. The storage device may also retrieve and/or deliver stored data to other components within the signal transmission device or to other electronic components connected to the signal transmission device. The interface may transmit an audio and/or video signal from the tuner or the storage device to one or more televisions and/or audio receiving devices.

Another embodiment of the signal transmission device may take the form of a set-top box with a module that may be connected to an output of the set-top box. The module may allow the set-top box to transmit at least two audio signals simultaneously from the same set-top box to two different receiving devices. For example, the module may allow the set-top box to transmit a second audio output signal including a radio frequency signal, an ultra high frequency signal or otherwise as a wireless signal.

Still another embodiment may take the form of a method for transmitting multiple audio signals. In this method, a first video signal and a first audio signal may be transmitted to a first receiving device from a single electronic device. Additionally, a second video signal may be transmitted to the first device. A second audio signal, associated with the second video signal, may be transmitted separately from the second video signal and received by a second receiving device.

It should be noted that embodiments of the present invention may be used in a variety of satellite systems and video/audio processing systems. Embodiments may include or work with a variety of electrical components, entertainment systems, receivers, transceivers, converters, set-top boxes, televisions and so on. Aspects of the present invention may be used with practically any apparatus related to receiving and transmitting signals, satellite systems, entertainment systems or any apparatus that may contain any type of communication system. Accordingly, embodiments of the present invention may be employed in computers, satellite systems, cable systems, electronic components used in to process signals and peripherals and so on.

Before turning to the disclosed embodiments in detail, it should be understood that the invention is not limited in its application to the details of the particular arrangements shown, because the invention is capable of other embodiments. Also, the terminology used herein is for the purpose of description and not of limitation.

Figure 1:
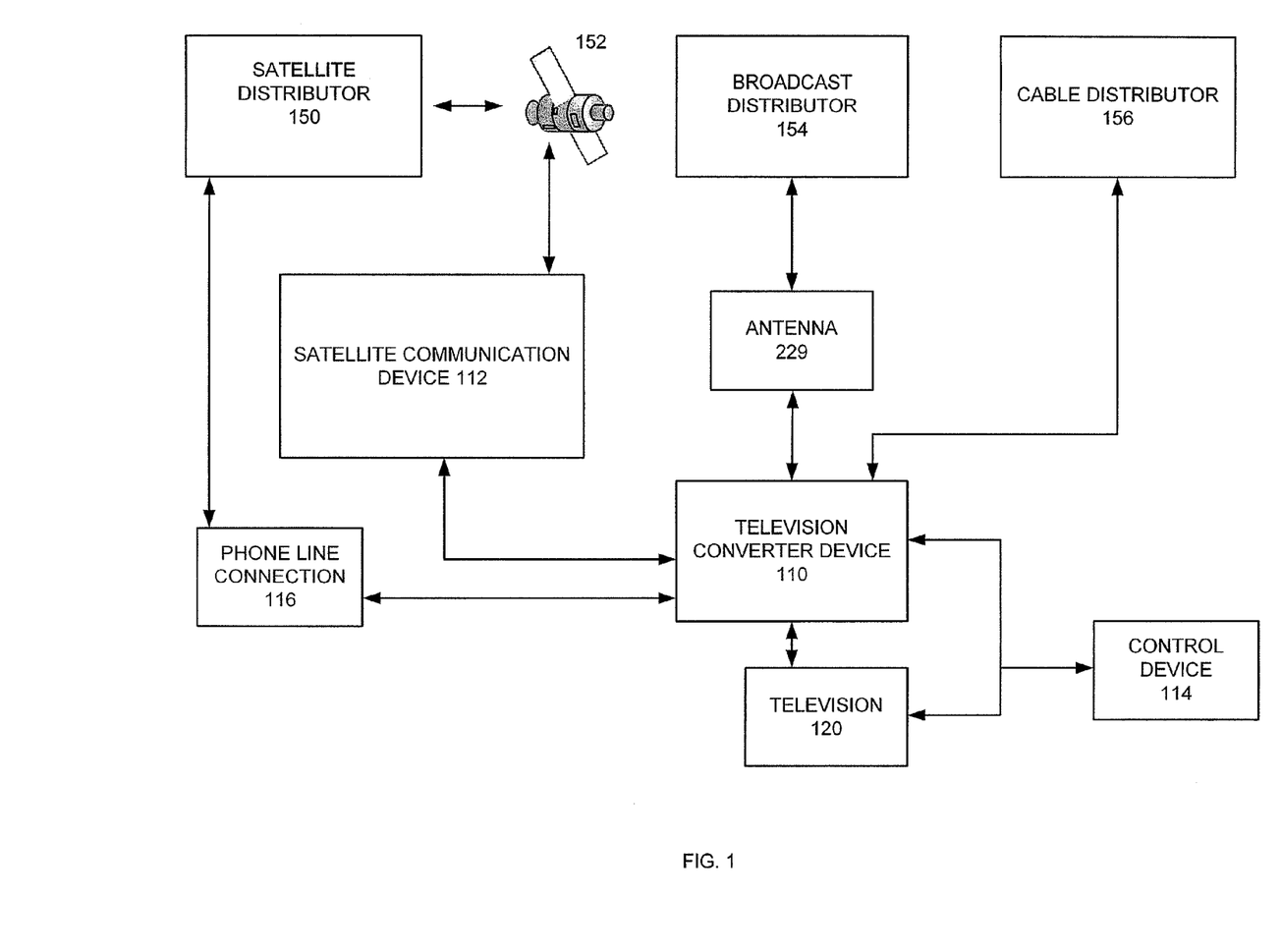
FIG. 1 depicts a system 100 that may include devices for receiving and transmitting television signals.

FIG. 1 shows an embodiment of a system 100 that may include a signal transmission device 110, a satellite communication device 112, a control device 114, a phone line connection 116, an antenna 118 and at least one video display such as, but not limited to, a television 120. The signal transmission device 110 may be any type of television receiver, for example, a satellite set-top box. The signal transmission device 110 may be a self-enclosed unit, be implemented as several separate units or may be included within a television. The signal transmission device 110 may be referred to herein as a set-top box for explanatory purposes only.

Generally, the set-top box 110 may receive signals directly from a cable distributor 156, from a broadcast distributor 154 via an antenna 118 or from a satellite distributor 150 via a satellite communication device 112. Each distributor 150, 154, 156 may provide audiovisual content or other data, albeit through a different transmission medium. The set-top box 110 may process the signals received from any of the aforementioned providers and/or distributors and may send the processed signals to at least the receiving devices 120 of the system 100. The functionality of the set-top box 110 will be described in further detail below.

As an example of signal propagation, the satellite distributor 150 may transmit one or more satellite signals 151 containing audio/video data such as a movie or television program, to one or more satellites 152. Each of the satellites 152 may have one or more transponders that transmit the signal 153 from the satellite to the subscriber. The transponders may polarize the transmitted signals 153, which may be received at the satellite communication device 112. For example, the transmitted signals 153 may be circularly polarized with opposite polarizations, which may prevent interference between transmitted signals.

The transmitted signals 153 may be received by the satellite communication device 112. The satellite communication device 112 may be, but is not limited to, a satellite dish 112 such as a circular satellite dish. The satellite dish 112 may focus the transmitted signal 153 on one or more low-noise block filters which may de-polarize the transmitted signal. Generally, a satellite dish may initially process the transmitted signals 153. The initial processing may include filtering noise from the transmitted signal 153, down-converting the transmitted signal, de-polarizing the transmitted signal and so on. The transmitted signal 153 may be down-converted to transmit a signal 101 through cables, such as coaxial cables, and to allow the signal 101 to arrive at the television receiver 110 via the cabling. Additionally, other methods and systems as known in the art may be employed to deliver the satellite signal 101 to the set-top box 110.

Figure 2:
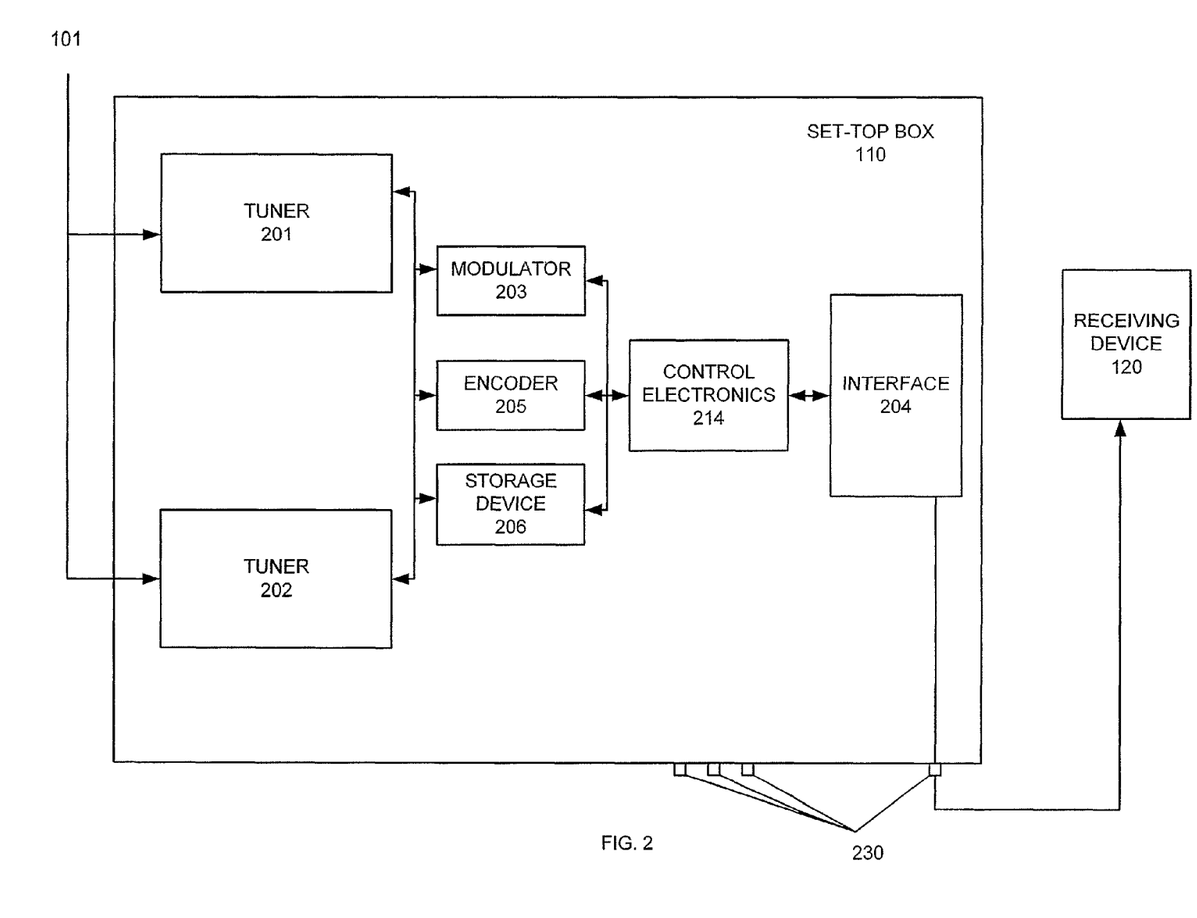
FIG. 2 shows one embodiment of a device for receiving and transmitting video and/or audio signals.

Turning to FIG. 2, the signal 101 may be received by the set-top box 110 and demodulated by a modulator or demodulator 203. The signal 101 may be received as an analog signal with data modulated thereon or the signal 101 may arrive as an analog signal that "carries" data (data may be modulated onto the analog signal). The signal may be modulated using amplitude modulation ("AM") or frequency modulation ("FM"), either of which may modulate digital data onto the signal. The modulation methods employed may be biphase-shift keying, quadraphase-shift keying, eight phase shift keying and so on. It may also be possible to employ analog data or combined analog and digital data.

The signal may be in (or converted to) digital form after the signal is demodulated, and may be multiplexed. Demultiplexing or "demuxing" the digital data may include separating the bits of data into separate digital data streams where the digital streams may be packetized. Thus, the separate digital data streams may be separated packet by packet instead of bit by bit. After demuxing the packets, the separate digital data streams may be reassembled by placing related packets together in a continuous data stream.

The separate digital data streams may also be encoded; encoding is generally a method for representing data. Encoding may allow the data to be compressed which may provide the system with increased bandwidth. The methods of encoding may include, but are not limited to, the MPEG, MPEG2 or MPEG4 standards. Further, in addition to including raw data, digital data streams may include forward error correction, headers, checksums, or other information. At least the aforementioned information may be included in each digital signal processed by the set-top box 110. The digital data streams may then be outputted to various electronic devices 120 such as a television, radio receiver, headphones and so on.

Returning to FIG. 1, the control device 114 of the system 100 may be referred to herein as a "remote control" or a "remote." The control device 114 may be used to transmit control commands to the set-top box 110 via a wireless signal such as an infrared ("IR") signal, a radio frequency ("RF") signal, an ultra high frequency ("UHF") and so on. Generally, wireless signals may include an infrared signal, a radio frequency signal, an infrared blaster, a Bluetooth signal, a wireless Internet Protocol ("IP") connection provided, cellular, WiMax, satellite signal, combinations thereof or otherwise. The control device 114 may also transmit control commands to other electronic devices of the system 100 such as the television 120. Further, the communication between the control device 114 and the set-top box 110 may be via the Internet, intranet, local area network ("LAN"), wide area network ("WAN"), Wireless-Fidelity ("WIFI"), wireless, coaxial cables, CAT5 cabling, fiber optic connections and so on.

As previously mentioned, the set-top box 110 may be connected to and communicate with one or more electronic devices 120. These electronic devices may receive signals from the set-top box 110 or send signals to the set-top box. For example, a television may receive video and/or audio signals, while a stereo may receive audio signals. In one embodiment, a set of headphones may receive, wireless or wired audio signals from the set-top box.

As depicted in FIG. 2, the set-top box 110 may include at least a first tuner 201, a second tuner 202, one or more modulators or demodulators 203, one or more encoders 205, a storage device or devices 206, an interface 204 and control electronics 214. In FIG. 2, the control electronics 214 may be connected to any of the aforementioned elements, such as the interface 204, the tuner 202 and the storage device 206. The configuration of the set-top box 110 in FIG. 2 provides only one example of the possible arrangements of the elements shown. Additionally, the set-top box may not have all of the elements shown in FIG. 2 or may include additional elements. The elements of the set-top box 110 may be connected to one another directly, operationally, functionally and so on. The control electronics 214 may include processors, volatile memory, non-volatile memory and/or discrete electronic component, all of which may be configured to control operation of any or all of the rest of the set-top box. Additionally, the control electronics 214 may include software, firmware and so on. The set-top box 110 may also include multiple outputs 230. The multiple outputs 230 and aforementioned elements of the set-top box 110 will be discussed in further detail below.

The set-top box 110 of FIG. 2 may include one or more tuners, such as first tuner 201 and second tuner 202. The tuners 201, 202 may process the signal 101 provided by the satellite communication device 112 of FIG. 1. The tuners 201, 202 may include demodulators, decoders, demultiplexers, data packet selectors and so on. Alternately, the signal may be processed after passing through the tuners 201, 202 by an encoder 205 and/or a modulator 203. The set-top box 110 may include at least one encoder 205 and at least one modulator 203. The functionalities of the encoder 205 and the modulator 203 were previously discussed with respect to FIG. 1.

The storage device 206 of FIG. 2 may receive and store data. The set-top box 110 may include one or more such storage devices 206. This data may be any type of digital data, including television programming, software, firmware, system data and so on. The storage device 206 may also retrieve data and deliver it to other devices and/or components internal to the set-top box 110 or to connected components external to the set-top box. The storage device 206 of the set-top box 110 may include, but is not limited to, optical storage media, hard drives, random access memory ("RAM"), read only memory ("ROM"), electro-optical storage devices, magnetic media and so on.

Although FIG. 2 shows interface 204 as communicating with the control electronics 214, the interface 204 may communicate with and/or receive a processed signal from the tuner 202, the storage device 206 or any of the elements included in the set-top box 110. The interface 204 may transmit the signal to any output of the multiple outputs 230 of the set-top box 110. The interface 204 may include digital to analog converters, electronic video drivers, video filters or other electronic devices to transmit video and/or audio signals. The output of the interface 204 may be an analog baseband signal, a modulated signal (e.g., modulated on channel 3 or 4 for reception by a television that may not have a baseband input), a digital output and so on.

The set-top box 110 may include multiple outputs 230 for audio signals, video signals, infrared signals, radio frequency signals and so on, and may output these signals individually or in combination. For example, the set-top box 110 may include at least two outputs that may be used to output at least two signals including, but not limited to, video signals, radio frequency signals, infrared signals, audio signals and so on.

Figure 3:
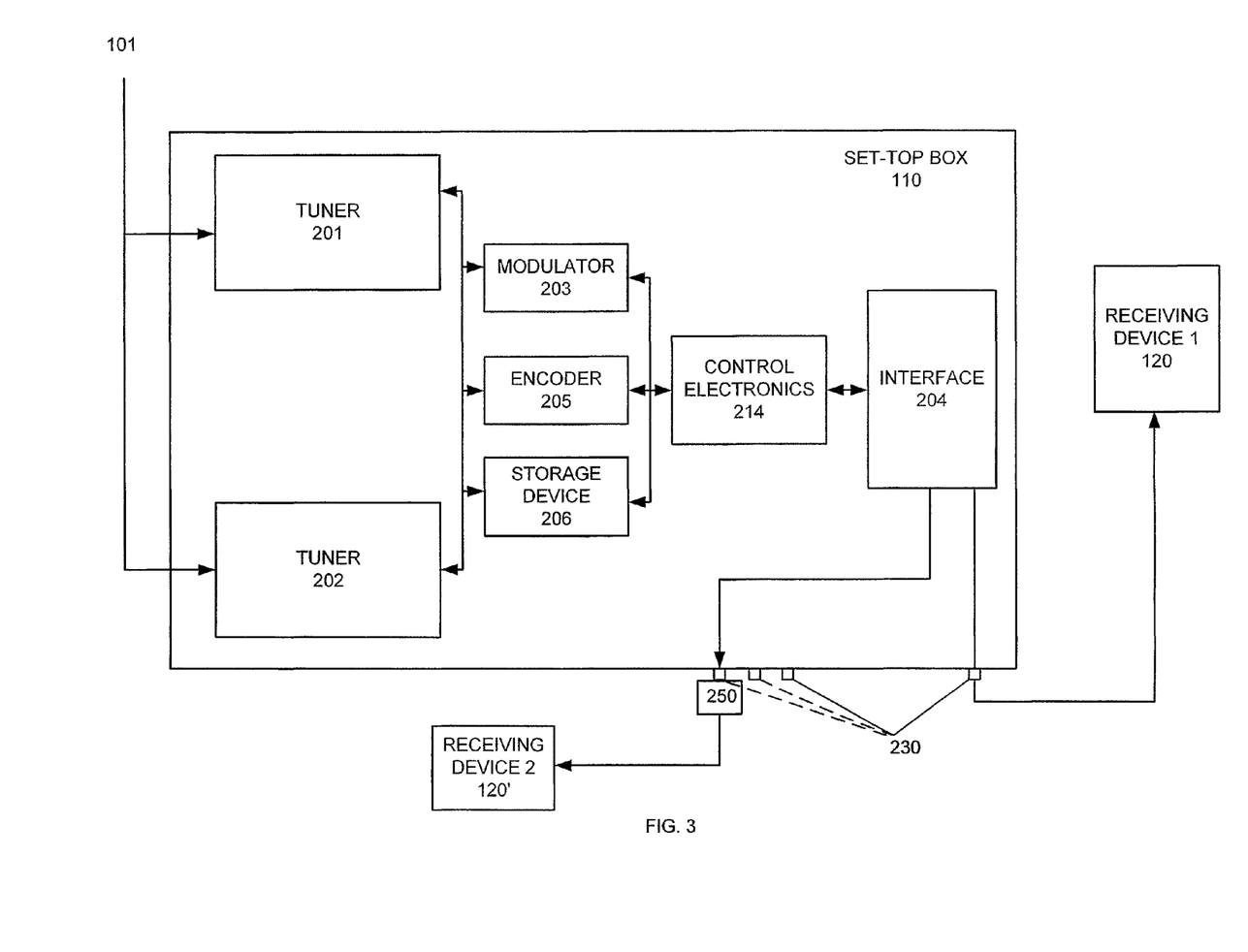
FIG. 3 shows another embodiment of a device for receiving and transmitting video and/or audio signals.

In one embodiment as depicted in FIG. 3, a module 250 may be connected to one output of the multiple outputs 230. The module 250 may provide an additional audio output from the set-top box 110. This additional audio output may allow more than one audio signal to be transmitted by the set-top box 110. The additional audio output may be received by more than one receiving device. The transmitted signals may be of various transmission types including wired, wireless, Bluetooth, infrared blast from the set-top box and so on.

Continuing this embodiment, the module 250 of FIG. 3, may provide various functionalities such as, but not limited to, transmitting an audio signal, modulating/demodulating an audio signal, separating an audio signal from a video signal, encoding/decoding a signal and so on. In one example, the module may demodulate a radio frequency signal outputted by the set-top box 110 and provide a separate audio signal by transmitting a separate radio frequency signal. The audio signal may correspond to a video signal and may be received via a headphone set. The headphone set may be tuned to receive a specific frequency, may automatically scan through a number of frequencies until the desired frequency is located, or may allow the user to manually scan through various frequencies until the desired frequency (in this case, the frequency of the audio signal transmitted by the module 250) is located.

In one embodiment, the set-top box 110 of FIG. 3 may transmit multiple video and/or audio signals to a first receiving device 120 and a second receiving device 120'. The transmitted signals may include both the video and audio signal on one signal and an audio signal separate from a corresponding video signal on another signal. For example, the video signal may be outputted to a first device 120 and the audio signal may be provided to a second device 120'. In this embodiment, the set-top box 110 may include a first tuner 201 and a second tuner 202. The first tuner 201 and the second tuner 202 may receive one signal with multiple channels. The set-top box may use the first and second tuners 201, 202 to process the incoming signal and to provide audio and video information for two channels. Continuing this embodiment, the first tuner 201 of the set-top box 110 may output and/or transmit a first set of signals, which may include a first audio signal and a first video signal combined, to provide an image with the corresponding sound on a television. The second tuner 202 of the set-top box 110 may also output a second set of signals where the second audio signal and the second video may be transmitted separately.

Figure 4:
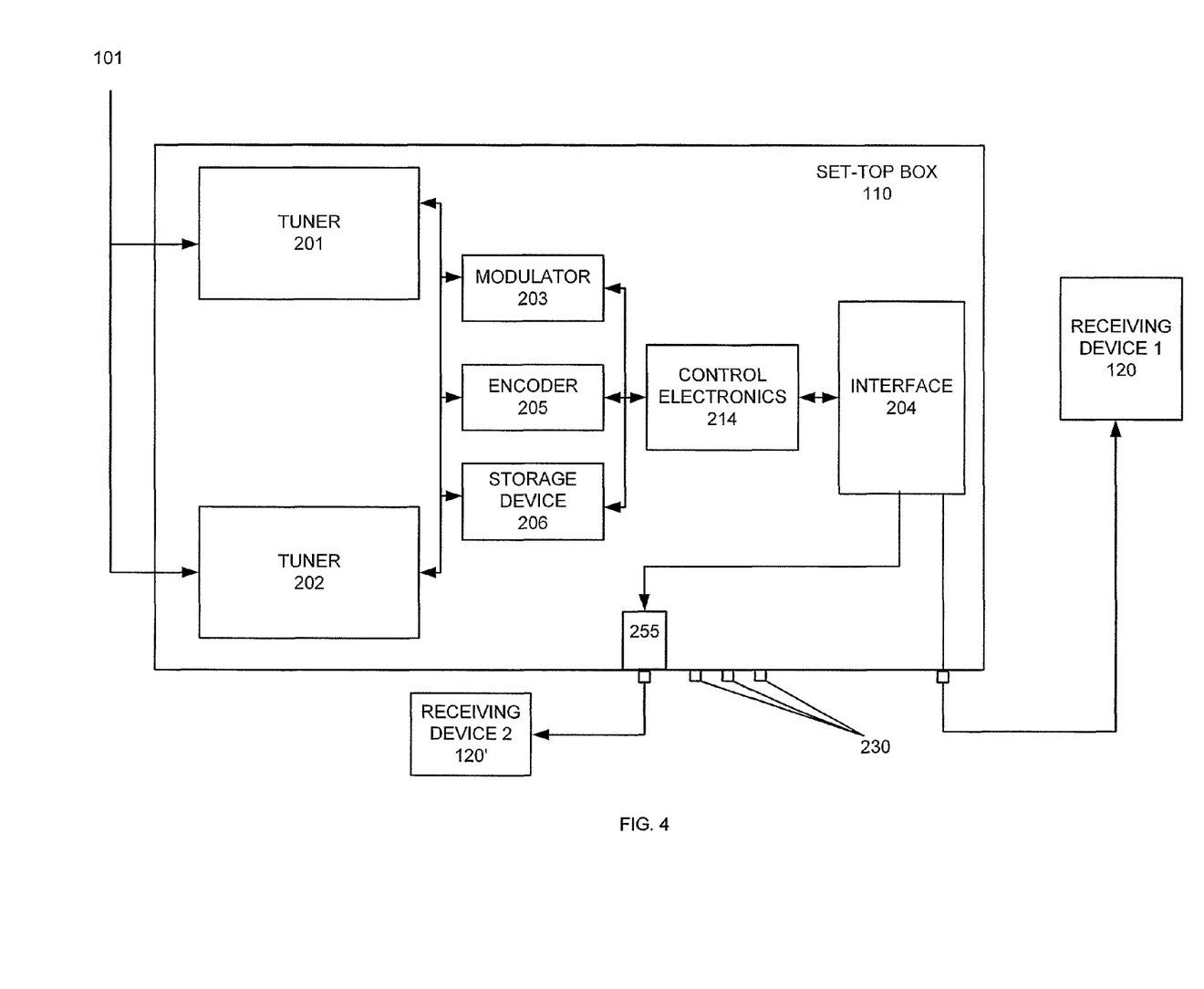
FIG. 4 depicts yet another embodiment of a device for receiving and transmitting video and/or audio signals.

In yet another embodiment of FIG. 4, the set-top box 110 may include an additional output or set of outputs. The additional output may function as a dedicated channel for a second audio output to be received by a second receiving device 120'. In this embodiment, the additional output may provide a second audio output for a corresponding second video signal. For example, an additional component such as a modulator 255 may be added to the set-top box 110 of FIG. 4. The modulator 255 may demodulate a radio frequency signal to "strip" or separate a second audio signal from the radio frequency signal and then output the second audio output from the set-top box to a second receiving device 120'. Although the second audio output may be an audio signal corresponding to a second video signal, the second audio output may also be a second method of outputting the same audio signal that corresponds to the main audio signal.

In one example of the embodiment depicted in FIG. 4, the first tuner 201 may provide a first signal via an interface 204 including a first video signal and a first audio signal. The first signal may be transmitted to a first device such as a picture-in-picture television. The first video signal and the first audio signal may be transmitted together to produce a picture and to provide the audio corresponding to the picture. The second tuner 202 may provide a second signal via the interface 204 including a second video signal and a second audio signal. In this example, the second signal may undergo further processing in the set-top box 110. The second signal may be demodulated so that the second audio signal may be transmitted separately (e.g., "stripped") from the second video signal. Continuing this example, the second video signal may be transmitted for display on the picture-in-picture television that is also displaying the first signal. The picture-in-picture television may have a first screen area and a second screen area. The second video signal may be displayed in either the first screen area and/or the second screen area. Similarly, the first video signal may be displayed in either the first screen area and/or the second screen area. Furthermore, the size of the first and second screen areas may vary. For example, the first screen area may be larger than the second screen area, the second screen area may be larger than the first screen area, the first and second screen areas may be displayed as a split screen and may be the same or similar sizes to one another and so on. The second audio signal may not be sent to the television, but instead be made available via one of the multiple outputs 230 of the set-top box 110. The multiple outputs 230 may include wireless transmission capability. The second audio signal may be transmitted via a wired device connected to one of the multiple outputs 230, wirelessly as previously discussed and so on. The second audio signal may be received in various ways including a headphone set. The various embodiments will be discussed in further detail below.

Figure 5:
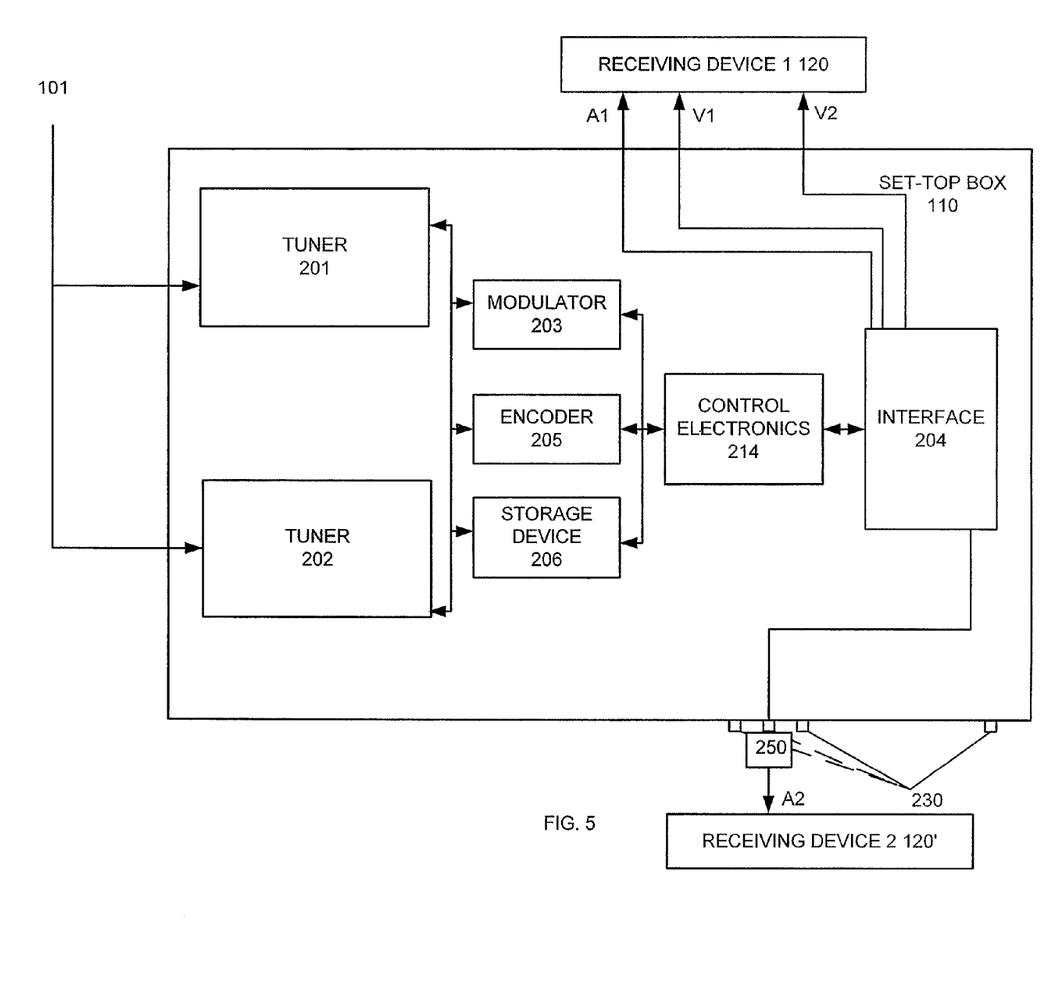
FIG. 5 depicts still another embodiment of a device for receiving and transmitting video and/or audio signals.

FIG. 5 depicts sample output signals from the set-top box 110. In FIG. 5, the set-top box 110 includes similar electrical components as the set-top box 110 as discussed with respect to FIGS. 2-4. In FIG. 5, the set-top box 110 may receive a first signal. The first signal may be processed similar to the signal processing as discussed with respect to FIGS. 2-4. The first signal may include a first video signal V1 and a first audio signal A1. The first video signal V1 and the first audio signal A1 may be transmitted together as the first processed signal to a first receiving device 120. Further, the first video signal V1 and the first audio signal A1 may be available via one output of the set-top box.

Continuing the embodiment of FIG. 5, the set-top box 110 may receive a second signal, which may include a second video signal V2 and a second audio signal A2. In FIG. 5, the second video signal V2 may be outputted after processing by at least the second tuner 202, to the first receiving device 120 (similar to the first video signal V1 and the first audio signal A1). By contrast, the second audio signal A2 may be outputted separately from the second video signal V2, from a set-top box 110 to a second receiving device 120' through a wired or wireless output. In one example, the set-top box 110 may transmit the second audio signal A2 via a radio frequency signal. In this example, the second audio signal may be separated from the second video signal after internal processing in the set-top box 110. For example, the second signal may include both the second video signal and the second audio signal may be demodulated such that the second audio signal may be separated from the second signal.

In a further example of this embodiment, the set-top box 110 may transmit the second audio signal A2 via a module that may be connected to one of the outputs of the set-top box as discussed with respect to FIG. 3. The module may plug into an output such as, but not limited to, a Dolby™ digital output, an optical audio output, an analog audio output, a digital audio output and so on of a set-top box 110. The module may perform additional processing to separate the audio signal from the video signal. The processing performed by the module may allow the audio signal and the video signal to be separately transmitted. The audio signal and video signal may also be transmitted from different outputs such as the module output and a video output from the set-top box to the television. In one example, the set-top box may have the ability to transmit a first signal to a first television and to also transmit a second signal to a second television. The first signal may include a first audio signal and a first video signal and second signal may similarly include both a second audio signal and a second video signal. A first receiving device 120 may receive the first signal. Continuing this example, a module may be connected to an output of the set-top box and may process the second signal which may be a radio frequency signal. The module may demodulate the second signal (the radio frequency signal) and separate the second audio signal from the second video signal and make the audio signal separately available for receipt by a second receiving device 120'.

Figure 6:
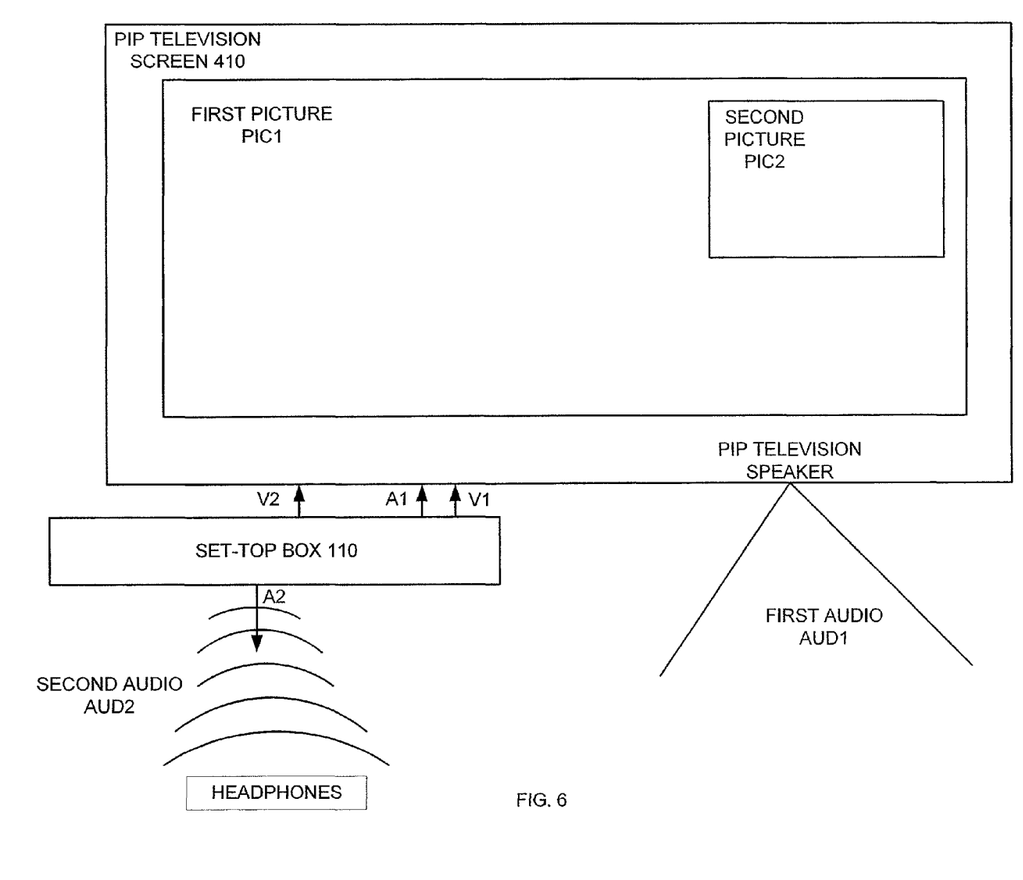
FIG. 6 depicts one embodiment of displaying multiple video signals and transmitting multiple audio signals.

As depicted in FIG. 6, in one embodiment, multiple pictures may be viewed on a picture-in-picture ("PIP") television screen 410. For example, both the first video VID1 and the second video VID2 are displayed on the PIP television screen 410. The first video VID1, may be displayed on the PIP television screen 410 using a first video signal provided by the set-top box. Further, first audio AUD1 may be provided by the set-top box 110 and may be a first audio signal corresponding to the first video VID1. The first audio signal and the first video signal may both be transmitted to the PIP television (not shown in its entirety). The first audio AUD1 may be an audio signal that is audible to a user without using any additional electronic components. The first audio AUD1 may be produced from, for example, the PIP television speakers. The first audio signal and the first video signal may be provided by the set-top box to the PIP television in a first set of information. Further, the first audio signal and the first video signal may be sent as a first set of information that may be transmitted together.

Continuing the embodiment as shown in FIG. 6, the second video VID2 may be displayed on the PIP television screen 410 using a second video signal provided by the set-top box 420. Additionally, a second audio AUD2 may be carried by a second audio signal and may correspond to the second video VID2. The second audio AUD2 may be transmitted by the set-top box 110 through different types of wireless signals. Further, the second audio AUD2 may be received using various components such as wired, wireless, Bluetooth or radio frequency headphones, radio frequency headphones, A/V receivers or speakers configured to receive such a wireless signal and so on. For example, the second audio AUD2 may be transmitted by the set-top box 420 via a radio frequency signal and may be received by radio frequency headphones.

Additionally, in the embodiment shown in FIG. 6, a user may toggle between which of the first video VID1 and the second video VID2 appears as the larger image on the PIP television screen 410. For example, the first video VID1 and the second video VID2 may be switched so that the second video VID2 may be the larger picture and the first video VID1 may be the smaller picture that appears in the corner of the PIP television screen 410. In this example of switching the appearance of the two pictures, the first audio AUD1 may be provided by the set-top box and received using headphones while the second audio AUD2 may be provided by the PIP television speakers and audible to a user without using additional components. Moreover, in another embodiment, although first video VID1 and the second video VID1 may switch appearance, the first audio AUD1 and the second audio AUD2 may not switch. Furthermore, in yet another embodiment, a user may toggle between the first audio AUD1 and the second audio AUD2 without switching the appearance of the two pictures. Additionally, the set-top box may allow switching between the video signals and between the audio signals by employing internal circuitry which may be embedded in the core chip.

In yet another embodiment of FIG. 6, the first video VID1 and the second video VID2 may remain as they appear in FIG. 6, while the second audio AUD2 may be produced by the PIP television speakers and audible to a user without using additional components. In this embodiment, the first audio AUD1 associated with the first video VID1 may be provided by the set-top box and the user may listen to the first audio AUD1 via a headphone set.

In still another embodiment, the first audio signal AUD1 and the second audio signal AUD2 may be available via at least a first and second set of headphones. The first and second set of headphones may receive the first audio signal AUD1 or the second audio signal AUD2. The first and second set of headphones may both receive the first audio signal AUD1 or may both receive the second audio signal AUD2. Additionally, the first set of headphones may receive the first audio signal AUD1 while the second set of headphones may receive the second audio AUD2 or vice versa. Continuing this embodiment, the first audio signal AUD1 and the second audio signal AUD2 may be transmitted by the set-top box, the PIP television or any combination thereof. Moreover, a single headphone set may be used to access both the first audio signal AUD1 and the second audio signal AUD2. The single headphone set may scan through a predefined set of frequencies to access either one of the first audio signal AUD1 or the second audio signal AUD2.

Figure 7:
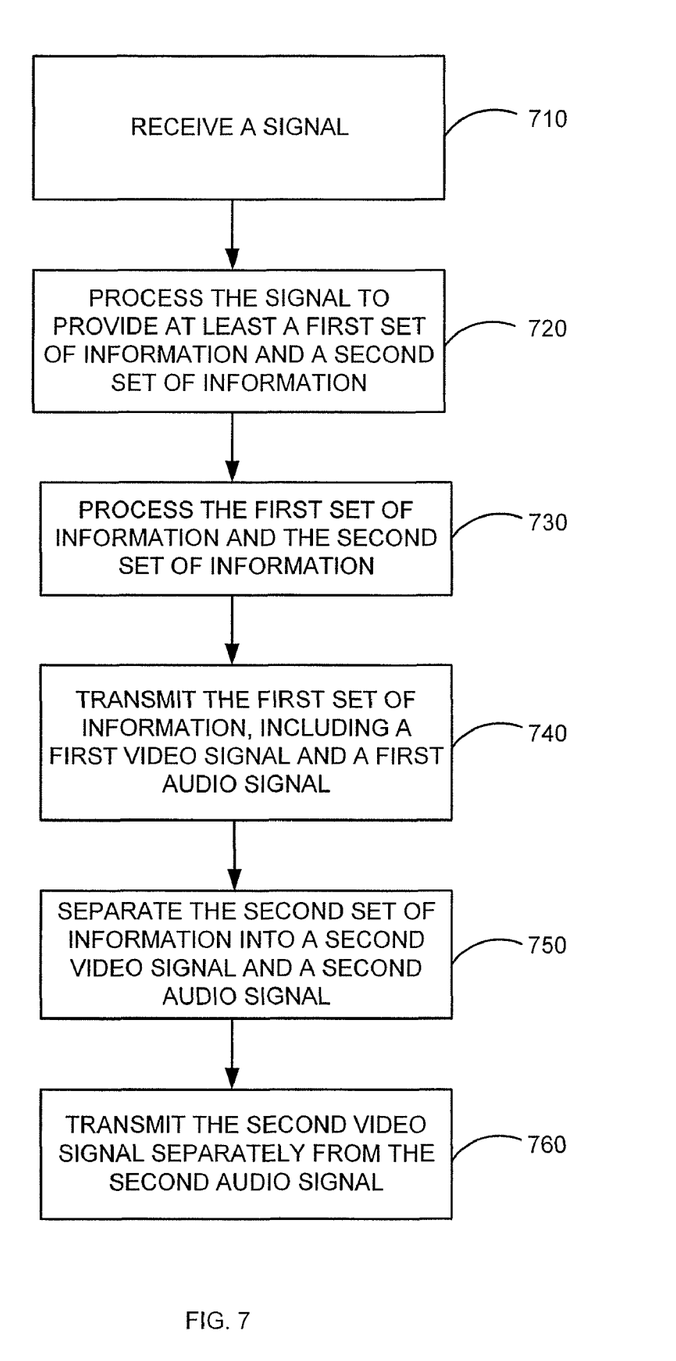
FIG. 7 is a flowchart depicting operations of a method for transmitting an audio signal.

FIG. 7 is a flowchart generally describing one embodiment of a method 700 for transmitting multiple audio signals where one of the audio signals is being separately transmitted from the corresponding video signal. The operations of method 700 are provided in an order shown for explanatory purposes only. Generally, the operations of method 700 may be performed in a different order than discussed herein.

Initially, the embodiment may receive a signal in the operation of block 710. The signal may include information for one or more channels. For example, the satellite communication device may receive the signal, initially process the signal and then provide the signal to the set-top box. The satellite communication device as previously discussed may filter out the noise of the received signal, amplify the signal without the noise and transmit the amplified signal to the set-top box.

In the operation of block 720, the signal may be processed to provide a first set of information and a second set of information. The signal may be processed using at least a first tuner and a second tuner. Although this embodiment uses a first and second tuner to provide the first and second set of information, any number of tuners, including one tuner may be used to provide the first and second set of information. The first set of information may include a first video signal and a first audio signal and the second set of information may include a second video signal and a second audio signal.

In the operation of block 730, the set-top box may perform additional processing on the first and second set of information. The additional processing may include, but is not limited to, modulating the signals that may be included in the first and second set of information, encoding the signals, storing the signals and so on. The first and second set of information may be processed as appropriate and in some cases, the first and second set of information may not need additional processing after passing through the tuner. For example, the signals included in the first and second set of information may not need to be demodulated or encoded after passing through the tuner. The signals may have been demodulated, for example, in the tuner and may not need to be additionally modulated after passing through the tuner. Alternately, the signals may not have been demodulated in the tuner and instead may be demodulated after passing through the tuner.

In the operation of block 740, the first set of information may be transmitted to a first device. As previously discussed, the first set of information may include a first video signal and a first audio signal. As previously discussed, the first video signal and the first audio signal may be transmitted together in the first set of information and may be available together through one connection and/or output. The first set of information may be transmitted to a first receiving device, thus providing the first device with both the first video signal and the first audio signal.

In the operation of block 750, the second set of information may be separated into a second video signal and a separate second audio signal. The second audio signal may be demodulated and separated from the second set of information, thus making the second audio signal separately available from the second video signal.

In the operation of block 760, the second video signal may be separately transmitted from the second audio signal. The second video signal may be transmitted to the first device while the second audio signal may be transmitted to a second device or may be available at a separate output from the second video signal. In one example, the second audio signal may be transmitted by a set-top box via a radio frequency transmitter. The second audio signal may also be outputted on the set-top box via a module connected to an output of the set-top box. The module may transmit the second audio signal wirelessly or wired as previously discussed.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. As but one example, various embodiments herein have been described as operating with, in or taking the form of a set-top box. Embodiments may be employed in virtually any electronic device that may receive a signal or audiovisual data, including, for example, a cable system receiver, an audio receiver, a computer, and so forth. Likewise, although embodiments have been described as operating with a satellite distribution system, embodiments may operate with any suitable network such as a cable or fiber network, an intranet, the Internet and so on. Accordingly, the proper scope of the invention is defined by the appended claims. The various embodiments, operations, components and configurations disclosed herein are generally exemplary rather than limiting in scope.

The invention claimed is:

1. A device for transmitting an audio stream separately from a video stream, comprising:
    an input operative to receive a service provider signal;
    a first tuner operative to receive the service provider signal from the input and configured to generate a first signal;
    a first demodulator accepting the first signal from the first tuner and configured to generate a first audio signal and first video signal from the first signal;
    a second tuner operative to receive the service provider signal from the input and configured to generate a second signal;
    a second demodulator accepting the second signal from the second tuner and configured to generate a second audio signal and second video signal from the second signal;
    an enclosure surrounding at least the first tuner, second tuner, the first demodulator, and the second demodulator;
    a first output from the enclosure, the first output operative to transmit the first audio signal and the first video signal;
    a second output from the enclosure, the second output operative to transmit the second video signal;
    third output from the enclosure, the third output operative to transmit the second audio signal; and
    a module located externally of the enclosure and connected to the third output, the module operative to receive the second audio signal and to convert the second audio signal into a wireless signal.

2. The device of claim 1, further comprising a user input, the user input operative to change a frequency of at least the second audio signal.

3. A method for transmitting at least a first and second audio signal, comprising:
    transmitting the first audio signal to a first device;
    transmitting a first video signal to the first device, the first video signal associated with the first audio signal;
    transmitting the second audio signal to a second device;
    transmitting a second video signal to the first device, the second video signal associated with the second audio signal;
    receiving a command to adjust the second video signal relative to the first video signal;
    in response to receiving the command, transmitting the second audio signal to the first device; and
    further in response to receiving the command, transmitting the first audio signal to the second device.

4. The method of claim 3, further comprising stripping the second audio signal from the second video signal prior to transmitting either the second audio signal or the second video signal.

5. The method of claim 3, wherein prior to receiving the command to adjust the second video signal relative to the first video signal, the method further comprising:
    displaying the first video signal on a first screen area of the first device; and
    displaying the second video signal on a second screen area of the first device.

6. The method of claim 5, wherein in response to receiving the command to adjust the second video signal relative to the first video signal, the method further comprising:
    switching the first video signal to display on the second screen area of the first device; and
    switching the second video signal to display on the first screen area of the first device.

7. The method of claim 6, wherein the first screen area surrounds the second screen area.

8. The method of claim 6, wherein at least one of the first and second audio signals are wirelessly transmitted.

9. The method of claim 3, wherein the second audio signal cannot be perceived without the second device.

10. The method of claim 3, wherein all transmissions are performed by a third device.

11. The method of claim 10, wherein the third device is a set-top box.

12. A method for transmitting information, comprising:
    providing a first video signal for display on a first screen area of a first device;
    providing a second video signal for display on a second screen area of the first device;
    providing a first audio signal to the first device;
    providing a second audio signal to a second device;
    receiving an audio toggle command;
    in response to receiving the audio toggle command, providing the second audio signal to the first device; and
    further in response to receiving the audio toggle command, providing the first audio signal to the second device.

13. The method of claim 12, further comprising:
    generating the first video signal and the first audio signal; and
    generating the second video signal and the second audio signal.

14. The method of claim 13, wherein the operation of separating the second set of information comprises:
    receiving the second set of information as a single signal including both the second video signal and second audio signal modulated together; and
    demodulating the second video signal from the second audio signal.

15. The method of claim 14, wherein the second format is a radio frequency.

16. The method of claim 13, wherein:
    the second audio signal is converted from a first format to a second format; and
    the second audio signal is provided to the second device in the second format.

* * * * *

UNITED STATES PATENT AND TRADEMARK OFFICE
CERTIFICATE OF CORRECTION

| | |
|---|---|
| PATENT NO. | : 8,239,897 B2 |
| APPLICATION NO. | : 12/205045 |
| DATED | : August 7, 2012 |
| INVENTOR(S) | : Robert Wadey |

Page 1 of 1

It is certified that error appears in the above-identified patent and that said Letters Patent is hereby corrected as shown below:

Column 11, Line 50:
"third output from the enclosure, the third output operative" should read, --a third output from the enclosure, the third output operative--.

Signed and Sealed this
Eighteenth Day of December, 2012

David J. Kappos
*Director of the United States Patent and Trademark Office*